United States Patent
Higashijima et al.

(10) Patent No.: US 6,985,998 B2
(45) Date of Patent: Jan. 10, 2006

(54) DISK ARRAY DEVICE FOR IDLE SEEK

(75) Inventors: Naoki Higashijima, Machida (JP); Seiki Morita, Odawara (JP); Ikuya Yagisawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 76 days.

(21) Appl. No.: 10/834,084

(22) Filed: Apr. 29, 2004

(65) Prior Publication Data

US 2005/0114597 A1 May 26, 2005

(51) Int. Cl.
*G06F 12/00* (2006.01)

(52) U.S. Cl. .................. 711/114; 711/100; 711/167
(58) Field of Classification Search ................ 711/100, 711/111, 114, 154, 167
See application file for complete search history.

(56) References Cited

U.S. PATENT DOCUMENTS

| | | | |
|---|---|---|---|
| 5,418,921 A * | 5/1995 | Cortney et al. | 711/114 |
| 5,606,470 A * | 2/1997 | Shioya et al. | 360/78.04 |
| 5,793,553 A | 8/1998 | Smith | |
| 5,838,991 A | 11/1998 | Shipman | |
| 5,859,738 A | 1/1999 | Forehand et al. | |
| 6,112,255 A * | 8/2000 | Dunn et al. | 710/7 |
| 6,122,131 A | 9/2000 | Jeppson | |
| 6,128,762 A * | 10/2000 | Jadav et al. | 714/766 |
| 6,385,000 B1 | 5/2002 | Ottesen et al. | |
| 6,502,165 B1 | 12/2002 | Kishi et al. | |
| 2002/0135922 A1 | 9/2002 | Smith | |

FOREIGN PATENT DOCUMENTS

| | | |
|---|---|---|
| EP | 0 978 824 A2 | 3/1995 |
| EP | 0 978 824 A3 | 3/1995 |
| EP | 0 820 059 A3 | 7/1997 |
| JP | 3-76078 | 8/1989 |
| JP | 7-121306 | 10/1993 |

\* cited by examiner

*Primary Examiner*—Tuan V. Thai
(74) *Attorney, Agent, or Firm*—Reed Smith, LLP; Stanley P. Fisher, Esq.; Juan Carlos A. Marquez, Esq.

(57) ABSTRACT

A disk array device that prevents the processing of the host device from being interrupted or delayed by drive idle seek, idle seek being executed by all the drives at approximately fixed intervals. The disk array device predicts the approach of the scheduled times to start idle seek of each of the disk drives 23, 23, . . . and exercises control so that, within the same parity group, idle seek is not executed by two or more drives 23, 23, . . . at the same time. Within the same parity group, one of the drives whose idle seek scheduled start time is approaching is considered in advance to be executing idle seek and hence data access is denied beforehand. When a data read request with respect to the drive 23 that is considered to be executing idle seek is received, the required data is recovered by reading data from all the other drives 23, 23, . . . belonging to the same parity group.

6 Claims, 6 Drawing Sheets

| PARITY GROUP NUMBER | DRIVE NUMBER | IDLE SEEK END TIME | STATUS INFORMATION |
|---|---|---|---|
| 0 | 0 | T0 | ON |
| | 1 | T1 | OFF |
| | 2 | T2 | OFF |
| | 3 | T3 | OFF |
| 1 | 4 | T4 | OFF |
| | 5 | T5 | OFF |
| | 6 | T6 | OFF |
| | 7 | T7 | ON |
| 2 | 8 | T8 | OFF |
| | 9 | T9 | OFF |
| | 10 | T10 | OFF |
| | 11 | T11 | OFF |
| ⋮ | ⋮ | ⋮ | ⋮ |

DISK ARRAY DEVICE FOR IDLE SEEK

CROSS-REFERENCE TO RELATED APPLICATIONS

This application relates to and claims priority from Japanese Patent Application No. 2003-393643 filed on Nov. 25, 2003, the entire disclosure of which is incorporated herein by reference.

BACKGROUND OF THE INVENTION

1. Field of the Invention

The present invention relates to a technology for controlling the idle seek of a plurality of disk drives in a disk array device.

2. Description of the Related Art

In order to prevent minute amounts of dust from being deposited on a particular track, disk drives generally have a function such as idle seek that blows away minute amounts of dust by moving the head at fixed intervals. Normally, when a period of a fixed period or more has elapsed since the end of the previous idle seek operation, a disk drive attempts to start idle seek, and starts idle seek if data access is not being executed at this time. However, if data access is being executed precisely at that point in time, an attempt to start idle seek is made again after the data access has ended.

Japanese Patent Application No. H7-121306 discloses a technology that reduces the overhead of the CPU and extends the life of the disk drive as far as possible by not executing idle seek even in the event of an idle seek request when a power conservation processing state is assumed.

However, when data access with respect to a disk drive is frequently not performed in a disk array device, there are cases where a state in which data access is performed even when the disk drive has attempted idle seek prevails and hence idle seek is not executed for a long period. Further, when a read request with respect to the disk drive is received from the host device during disk-drive idle seek, the disk drive cannot be accessed until the idle seek ends. Hence, there are also problems such as that of an interruption of or delay in the processing of the host device. These problems are particularly prominent in the case of a high-capacity disk drive and a high-load environment.

SUMMARY OF THE INVENTION

Accordingly, an object of the present invention is to prevent a delay in the processing of the host device caused by disk-drive idle seek.

Another object of the present invention is to uniformly execute disk-drive idle seek as far as possible approaching fixed intervals.

A disk array device that provides a host device with required data in accordance with a data read request from the host device according to one aspect of the present invention comprises: a plurality of disk drives that belongs to at least one parity group, each disk drive of which starts idle seek, unless data access is taking place, when a period equal to or more than a first threshold value period has elapsed from the time the previous idle seek ends; a disk interface for communicating with the disk drives; a host device interface for communicating with the host device; and a control device that is connected to the disk interface and the host device interface and controls the disk array device. Further, the control device comprises:

(1) a time monitoring unit which has ON or OFF status information for each of the plurality of disk drives and alternately switches the status information of each disk drive ON and OFF, such that, in cases where a period equal to or more than a second threshold value period shorter than the first threshold value period has elapsed after switching the status information of each of the disk drives from ON to OFF, when the status information of all the other disk drives belonging to the same parity group as each of the disk drives is OFF, the status information of each of the disk drives is switched from OFF to ON, and then, once the idle seek of each of the disk drives has ended, the status information of each of the disk drives is switched from ON to OFF;

(2) a multiple idle seek prevention unit, which, in cases where a period equal to or more than the second threshold value period has elapsed after switching the status information of each of the disk drives from ON to OFF, prevents each of the disk drives from starting idle seek by performing dummy access with respect to each of the disk drives when the status information of any of the other disk drives belonging to the same parity group as the disk drives is ON; and (3) a data access control unit which, in cases where required data is read from the disk drive in response to the read request from the host device, when the status information of a target disk drive where the required data is stored is OFF, sends the required data to the host device by reading the required data from the target disk drive and, when the status information of the target disk drive is ON, recovers the required data by reading data from all the other disk drives belonging to the same parity group as the target disk drive without performing data access with respect to the target disk drive, and then sends the required data thus recovered to the host device.

According to one embodiment, the time monitoring unit comprises: a drive management table that stores, for each of the plurality of disk drives, the status information and the elapsed period from the time the status information was switched from ON to OFF on the previous occasion, the status information and elapsed period being associated with discrimination information for each of the disk drives and discrimination information for a parity group to which the disk drives belong; and the data access control unit judges whether to switch the status information of each of the disk drives from OFF to ON by referencing the drive management table.

A disk array device comprising a plurality of disk drives belonging to at least one parity group, each disk drive of which starts idle seek unless data access is taking place, in accordance with a predetermined time schedule according to another aspect of the present invention comprises: a multiple idle seek prevention unit that controls the plurality of disk drives so that, within the same parity group, at most only one disk drive executes idle seek and two or more disk drives do not execute idle seek at the same time; and data read control means that, when a data read request with respect to a disk drive executing idle seek is received, recover required data by reading data from all the other disk drives belonging to the same parity group as the disk drive executing idle seek.

According to an embodiment, the disk array device further comprises an idle seek start prediction unit that detects in advance a disk drive that is predicted to start idle seek in accordance with the predetermined time schedule. Further, when the disk drive that is predicted to start idle seek is detected by the idle seek start prediction unit, in cases where another drive within the same parity group as the detected disk drive is executing idle seek, the multiple idle seek prevention unit performs dummy access with respect to the detected disk drive so that the detected disk drive does not start idle seek.

According to an embodiment, when the disk drive that is predicted to start idle seek is detected by the idle seek start prediction unit, the data read control means consider that the detected disk drive is executing idle seek in cases where no other disk drive within the same parity group as the detected disk drive is executing idle seek, and, when a data read request with respect to the detected disk drive is then received up until the detected disk drive ends idle seek, the data read control means recover the required data from data in all the other disk drives belonging to the same parity group as the detected disk drive.

A disk array device that comprises a plurality of disk drives belonging to at least one parity group according to yet another aspect of the present invention comprises an idle seek control unit that controls the plurality of disk drives so that, within the same parity group, at most one disk drive that is not undergoing data access executes idle seek in accordance with a predetermined time schedule; and data read control means which, when a data read request with respect to a disk drive executing idle seek is received, recover the required data by reading data from all the other disk drives belonging to the same parity group as the disk drive executing the idle seek.

According to an embodiment, the idle seek control unit controls the disk drives so that, within the same parity group, at most one disk drive for which a period equal to or more than a predetermined period from the end of the previous idle seek has elapsed executes idle seek unless data access is taking place.

A disk drive that is constituted to measure time, and, unless data access is taking place, start idle seek in accordance with a predetermined time schedule based on the measured time according to yet another aspect of the present invention comprises: a status information communication unit that communicates status information on whether idle seek is being executed to an external device; and a time communication unit that communicates the measured time to the external device.

According to an embodiment, the disk drive further comprises an idle seek external control unit that, upon receiving a command from the external device, is forced to start or not start idle seek irrespective of the predetermined time schedule.

A method for controlling the idle seek of a disk array device according to yet another aspect of the present invention is applied to a disk array device that provides a host device with required data in accordance with a data read request from the host device, comprising: a plurality of disk drives that belongs to at least one parity group, each disk drive of which starts idle seek, unless data access is taking place, when a period equal to or more than a first threshold value period has elapsed from the time the previous idle seek ends; a disk interface for communicating with the disk drives; a host device interface for communicating with the host device; and a control device that is connected to the disk interface and the host device interface and controls the disk array device. The control method comprises the steps of:

(1) storing ON or OFF status information for each of the plurality of disk drives;

(2) switching the status information of each disk drive ON and OFF, such that, in cases where a period equal to or more than a second threshold value period shorter than the first threshold value period has elapsed after switching the status information of each of the disk drives from ON to OFF, when the status information of all the other disk drives belonging to the same parity group as each of the disk drives is OFF, the status information of each of the disk drives is switched from OFF to ON;

(3) once the idle seek of each of the disk drives has ended after the status information of each of the disk drives is switched from OFF to ON, switching the status information of each of the disk drives from ON to OFF;

(4) in cases where a period equal to or more than the second threshold value period has elapsed after switching the status information of each of the disk drives from ON to OFF, preventing each of the disk drives from starting idle seek by performing dummy access with respect to each of the disk drives when the status information of any of the other disk drives belonging to the same parity group as the disk drives is ON;

(5) in cases where required data is read from the disk drive in response to the read request from the host device, when the status information of a target disk drive where the required data is stored is OFF, sending the required data to the host device by reading the required data from the target disk drive and, (6) in cases where required data is read from the disk drive in response to the read request from the host device, when the status information of the target disk drive is ON, recovering the required data by reading data from all the other disk drives belonging to the same parity group as the target disk drive without performing data access with respect to the target disk drive, and then sending the required data thus recovered to the host device.

A method of controlling the idle seek of a disk array device according to yet another aspect of the present invention is applied to a disk array device that comprises a plurality of disk drives belonging to at least one parity group, each disk drive of which starts idle seek unless data access is taking place, in accordance with a predetermined time schedule. The control method comprises the steps of: controlling the plurality of disk drives so that, within the same parity group, at most only one disk drive executes idle seek and two or more disk drives do not execute idle seek at the same time; and when a data read request with respect to a disk drive executing idle seek is received, recovering required data by reading data from all the other disk drives belonging to the same parity group as the disk drive executing idle seek.

A method of controlling the idle seek of a plurality of disk drives belonging to at least one parity group of a disk array device that comprises the plurality of disk drives according to yet another aspect of the present invention, comprising the steps of: controlling the plurality of disk drives so that, within the same parity group, at most one disk drive that is not undergoing data access executes idle seek in accordance with a predetermined time schedule; and, when a data read request with respect to a disk drive executing idle seek is received, recovering the required data by reading data from all the other disk drives belonging to the same parity group as the disk drive executing the idle seek.

According to the present invention, within the same parity group, at most only one disk drive executes idle seek, while the other disk drives do not execute idle seek at the same time. Further, in the event of a data access request with respect to the disk drive executing idle seek, the required data is recovered by means of data read from other disk drives belonging to the same parity group, whereby it is possible to prevent the processing of the host device from being delayed by disk-drive idle seek.

Further, a disk drive whose idle seek is started in accordance with a predetermined time schedule is pre-assessed, and, unless any other disk drive within the same parity group is also executing idle seek, the detected disk drive is considered to have commenced idle seek beforehand, meaning that data access with respect to the detected disk drive is stopped. When data on the detected disk drive is to be recovered from data that is read from another drive belonging to the same parity group, disk-drive idle seek is executed as far as possible approaching fixed intervals.

DESCRIPTION OF THE PREFERRED EMBODIMENTS

An embodiment of the disk array device according to the present invention will be described below.

Figure 1:
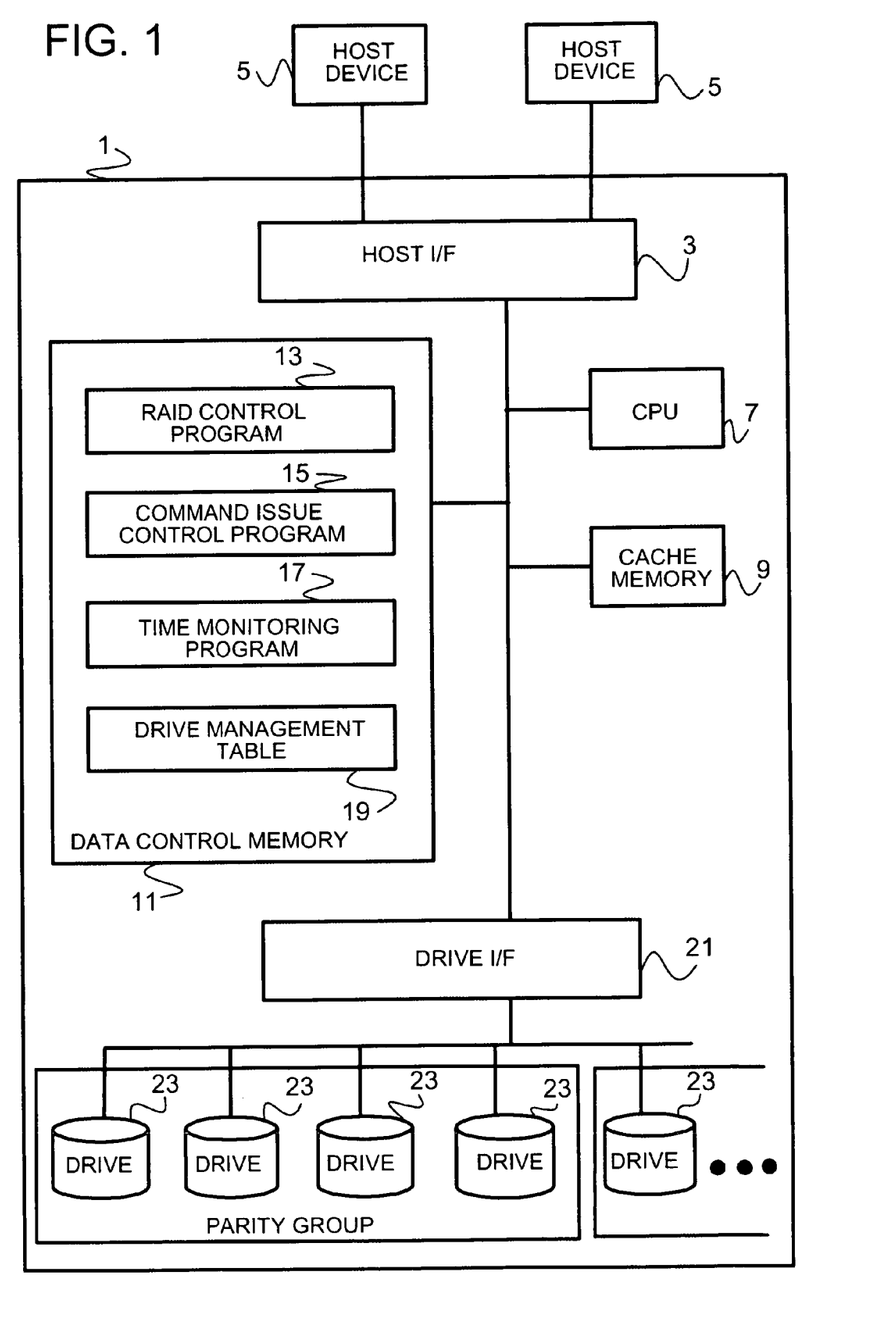
FIG. 1 is a block diagram showing an outline constitution of the disk array device according to an embodiment of the present invention.

FIG. 1 is an outline constitutional view of the disk array device according to an embodiment of the present invention.

The disk array device 1 is connected to one or a plurality of host devices 5 via a host interface (hereinafter called a 'host I/F') 3. The disk array device 1 and host device 5 can be connected via an interface such as a SCSI (Small Computer System Interface), a fiber channel, or the like, for example.

The disk array device 1 comprises a cache memory 9, a data control memory 11, one or a plurality of CPU 7, a drive interface (hereinafter called a 'drive I/F') 21, and a plurality of disk drives (hereinafter referred to simply as 'drive') 23, 23 . . . connected to the drive I/F 21.

A host I/F 3 mainly communicates with the host device 5, sending and receiving read/write target data together with a command such as a data access request with respect to the host device 5 and the corresponding response, for example. The drive I/F 21 communicates with drives 23, 23, . . . , sending and receiving read/write target data and commands such as data access commands with respect to the drives 23, 23, . . . , for example.

The CPU 7 parses and processes commands such as data access requests from the host device 5, and performs overall control of the disk array device 1. The CPU 7 also controls the idle seek of the drives 23, 23, . . . according to the present invention.

The cache memory 9 temporarily stores data received from the host device 5 and data read from the drives 23, 23, . . . . For example, upon receiving a read request for data in a certain drive 23 from the host device 5, the disk array device 1 checks whether or not this data is in the cache memory 9, and, when this data is indeed present in the cache memory 9, this data is read from the drive 23 to the cache memory 9 and then sent from the cache memory 9 to the host device 5.

The data control memory 11 stores a variety of management and control tables that are referenced and updated by the CPU 11, and various programs run by the CPU 7. Of these tables and programs, the programs and tables for controlling the idle seek according to the present invention in particular include a RAID control program 13, a command issue control program 15, a time monitoring program 17, and a drive management table 19. The functions and operation of the RAID control program 13, the command issue control program 15, and the time monitoring program 17 will be described in detail subsequently.

Period measurements are made for the plurality of drives 23, 23, . . . , and, unless data access is taking place, idle seek is started autonomously according to a predetermined time schedule based on the periods thus measured. More specifically, each drive 23 autonomously measures the period elapsed since the previous idle seek end time for the drive, and, when the elapsed period is equal to or more than a predetermined threshold value period, an attempt is made autonomously to start idle seek, and as long as data access is not being performed at this time, idle seek is started. If, on the other hand, data access is being performed at the moment the attempt to start idle seek is made, each drive 23 reattempts the idle seek start after a short interval. If data access is not being performed at this time, idle seek is started. Further, there is a plurality of types of idle seek whose methods differ, each type of idle seek being performed as mentioned above according to an intrinsic time schedule. Control according to the principles of the present invention (described in detail subsequently) can be performed in parallel relative to this plurality of different types of idle seek.

Each drive 23 does not normally have an interface for communicating, to an external device, the progress of the time schedule of an autonomously performed idle seek (such as the elapsed period from the end of the idle seek, for example) and the status such as whether the idle seek is actually being performed. Therefore, as described subsequently, the CPU 11 estimates, from outside, the progress of the time schedule of the idle seek of each drive 23 (such as the elapsed period from the end of the idle seek, for example) and the status such as whether the idle seek is actually being executed (that is, simulates a period measurement for scheduling the idle seek performed by each drive 23), and thus controls each drive 23 based on the results of this estimation, that is, simulation.

Figure 2:
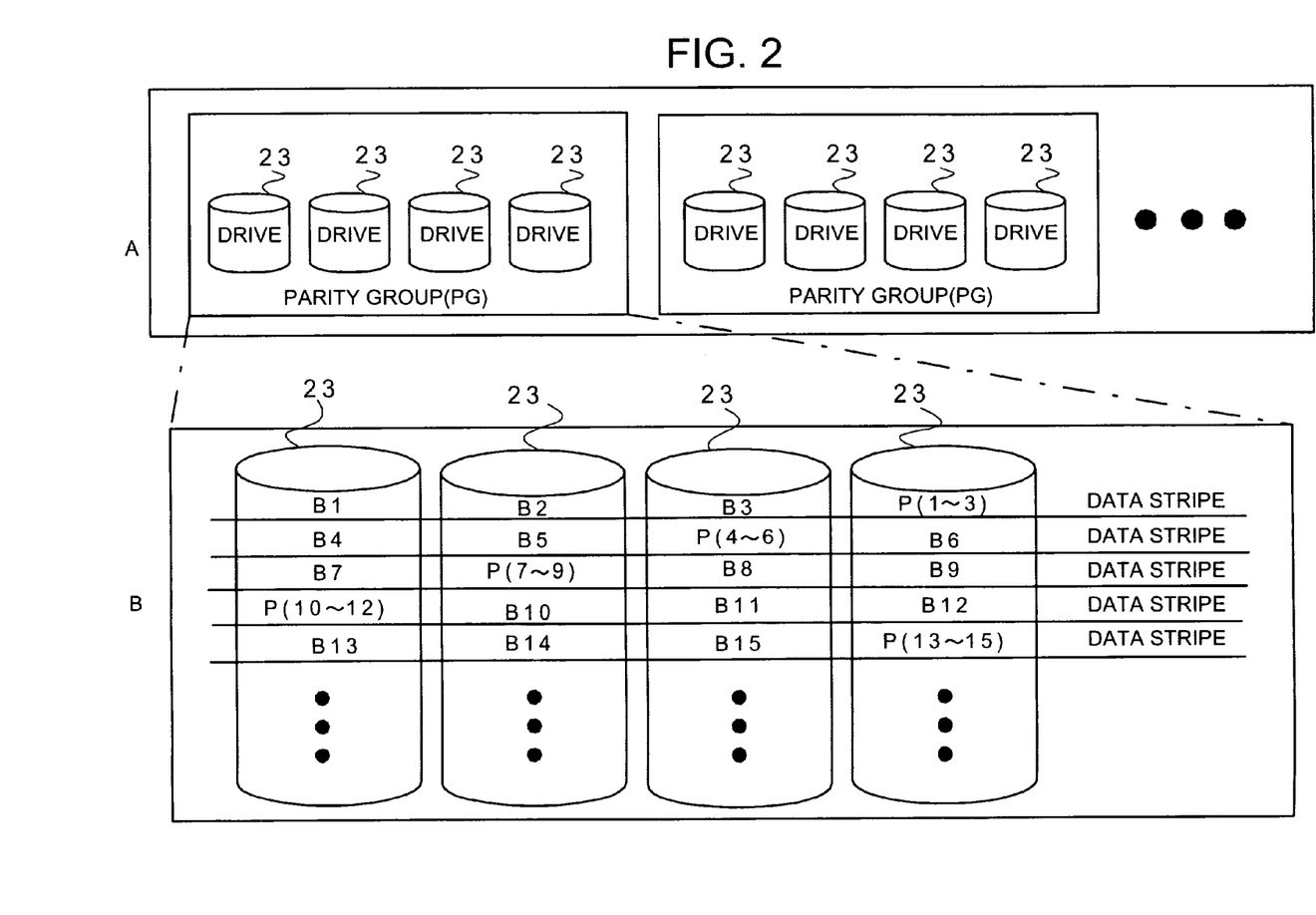
FIG. 2 is a block diagram illustrating a parity group.

Further, the plurality of drives 23, 23, . . . constitutes a parity group that follows the principles of RAID for a predetermined number of drives. FIG. 2 shows a method of storing data in the parity group in the format 3D+1P as an example. As shown in FIG. 2A, a parity group PG in the format 3D+1P is constituted for each of four disk drives. As shown in FIG. 2B, storage regions of four disk drives belonging to the same parity group are divided into a multiplicity of small regions known as 'data stripes' extending over all four drives 23, 23, . . . . One data stripe is constituted by four small regions (referred to hereinbelow as 'data blocks') that are contained in the four drives 23, 23, . . . . Of four data blocks that constitute one data stripe, target data that is an access target of the host device 5 are stored in three data blocks, while parity data created from the target data is stored in the one remaining data block. For example, the data stripe shown at the very top of FIG. 2B is such that B1, B2, and B3 are target data and P(1 to 3) are parity data created from B1, B2, and B3. The three target data and single parity data item are related in that any data item can be recovered from the three other data items. Therefore, within the same parity group, the data of each drive 23 of the four drives 23, 23, . . . can be recovered from data of the other three drives 23, 23, . . . . Further, the parity group in the format constituted by the four drives above is merely a simple example. A parity group in another format that is constituted by a separate plurality of drives can also be adopted. Whichever format is adopted, within the same parity group, any drive data can be recovered from the data of all the other drives, and is one advantage that the parity drive possesses. As described below, this advantage is utilized in the control of the idle seek according to the principles of the present invention.

Figure 3:
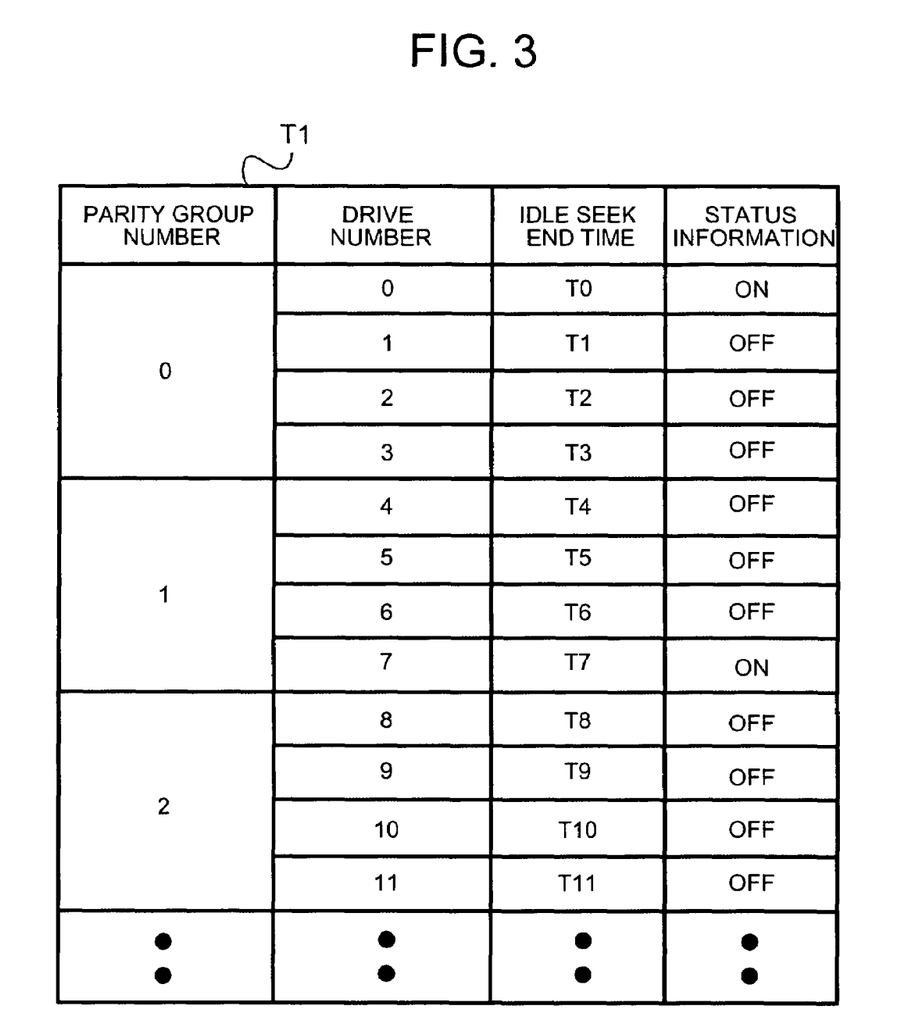
FIG. 3 shows a constitutional example of a drive management table.

FIG. 3 shows a constitutional example of the drive management table 19. Stored in the drive management table 19 for all the drives 23, 23, . . . that the disk array device 1 comprises are, respectively, discrimination information for discriminating the parity group to which the drive belongs, such as the parity group number, for example, discrimination information for discriminating the drive, such as a drive number, for example, the elapsed period from the time the status information was switched from ON to OFF on the previous occasion, and the status information. Here, status information has either of the values 'ON' and 'OFF'. The 'ON' of the status information signifies that the CPU 11 considers (estimates) that idle seek is being executed by the corresponding drive 23, or that the CPU 11 permits the execution of idle seek by the corresponding drive 23. Conversely, the 'OFF' of the status information signifies that the CPU 11 considers (estimates) that the idle seek is not being executed by the corresponding drive 23, or that the CPU 11 denies the execution of idle seek by the corresponding drive 23. The drive management table 19 is mainly updated and referenced by the time monitoring program 17 (described later). As described subsequently, the elapsed period is measured by the time monitoring program 17, an operation to switch the status information from ON to OFF and vice versa with timing that is based on the elapsed period is performed, and data access with respect to the drive 23 is controlled by the RAID control program 13 and command issue control program 15 on the basis of the status information of the drives 23, 23, . . . . Accordingly, the schedule for commencing idle seek that is autonomously controlled by the drives 23, 23, . . . is suitably adjusted.

A detailed description is provided below for the control operation performed by the CPU 11 by executing the RAID control program 13, command issue control program 15, and time monitoring program 17.

Figure 4:
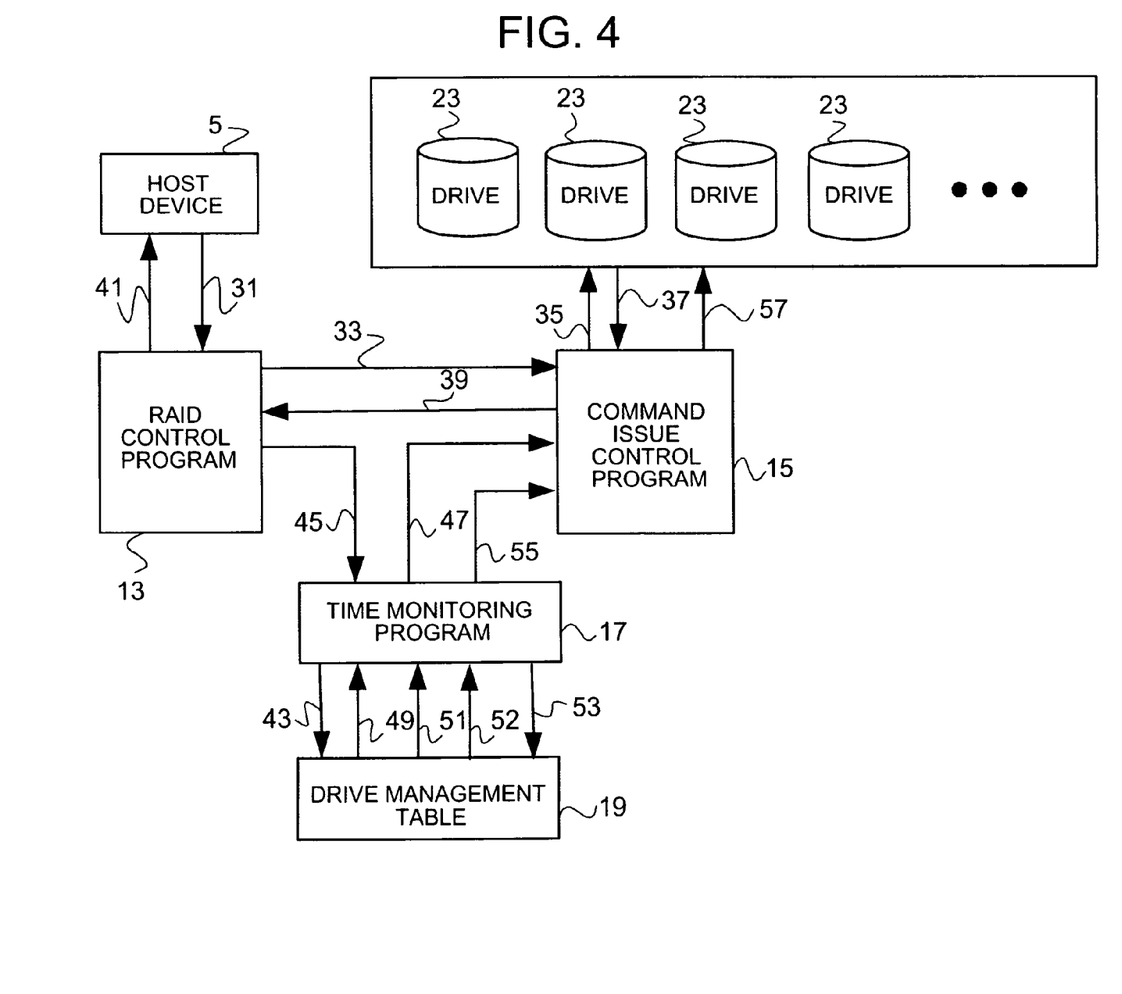
FIG. 4 is a block diagram illustrating the correlation between the processing of a RAID control program, a command issue control program and a time monitoring program.

FIG. 4 shows the correlation between the RAID control program 13, command issue control program 15, and time monitoring program 17.

The RAID control program 13 receives a host command 31 requesting data access from the host device 5 (data read and data write), parses this command, and sends an internal command 33 such as a command to read or write data of a given storage region of a given disk to the command issue control program 15. The command issue control program 15 then sends a drive command 35 for reading or writing data to the drive 23 in accordance with the internal command 33. The access target drive 23 does not perform an operation according to the drive command 35 and, as a result, sends back a drive response 37 to the drive command 35 to the command issue control program 15. More particularly, when the drive command 35 requests data reading, data that is read (read data) is included in the drive response 37 corresponding with this drive command 35.

The command issue control program 15 sends back an internal response 39 to the internal command 33 to the RAID control program 13. More particularly, when the internal command 33 requests data reading, the read data is included in the corresponding internal response 39. In this case, although omitted from the drawings, the read data is temporarily written to the cache memory 9 by the command issue control program 15 and then the cache memory 9 is read by the RAID control program 13. The RAID control program 13 sends back a host response 41 to the host command 31 to the host device 5. More particularly, when the host command 31 requests data reading, the read data is included in the corresponding host response 41.

The basic operation of the RAID control program 13 and command issue control program 15 was described above. In addition to this basic operation, the following operations are performed in order to control the idle seek of the drives 23, 23, 23 . . . .

The time monitoring program 17 continuously measures the elapsed period from the time the respective status information items of all the drives 23, 23, 23 . . . were switched from ON to OFF on the previous occasion, and records the elapsed period 43 in the drive management table 19. The measurement of the elapsed period is started in sync with the time the operation is started when the drives 23, 23, . . . are turned ON, for example, and therefore an elapsed period that substantially matches the elapsed period from the end of the previous idle seek measured within each of the drives 23, 23, . . . can be measured.

When the RAID control program 13 receives the data access request 31 from the host device 5 and this is a data 'read' request, the RAID control program 13 sends a status check instruction 45 for checking the status of the drive (hereinafter called the 'target drive') 23 carrying the read target data (hereinafter called 'target data') to the time monitoring program 17. In response to the status check instruction 45, the time monitoring program 17 reads status information 49 for the target drive 23 from the drive management table 19 and transfers the read status information 47 to the command issue control program 15. The command issue control program 15 receives the internal command (in this case, the data read request for the target drive 23) 33 from the RAID control program 13 and receives the status information 47 on the target drive 23 from the time monitoring program 17.

Then, if the status information for the target drive 23 is OFF (in short, if the target drive 23 is not executing idle seek), the command issue control program 15 reads the target data from the target drive 23 and sends this target data to the RAID control program 13 via the cache memory 9 as the internal response 39 as mentioned earlier. When, on the other hand, the status of the target drive 23 is ON, (in short, if the target drive 23 is executing idle seek), the command issue control program 15 reads three data items from three data blocks belonging to the same data stripe as the data block of the target data in the three other drives 23, 23, . . . within the same parity group as the target drive 23, recovers the target data from these three data items, and then sends the recovered target data to the RAID control program 13 via the cache memory 9 as the internal response 39. The RAID control program 13 then sends the target data received from the command issue control program 15 via the cache memory 9 to the host device 5 as the host response 41. Therefore, even when the target drive 23 is executing idle seek, the host device 5 is able to obtain the target data without waiting until the end of idle seek.

Further, the time monitoring program 17 detects, at an early stage some time before the actual idle seek start time, a drive among the drives 23, 23, . . . that has been estimated to be approaching the scheduled start time for idle seek according to the time schedule that is autonomously controlled by monitoring the elapsed period 51 of all the drives 23, 23, . . . in the drive management table 19. Described more specifically, this method of detection is as follows. That is, as described earlier, when, according to the time schedule in each drive 23, a period that is equal to or more than a predetermined threshold value period from the previous idle seek end time (hereinafter called the 'reference threshold value period') has elapsed, idle seek is started unless data access is being executed at this time. Therefore, the time monitoring program 17 checks whether the elapsed period of each drive 23 in the drive management table 19 is equal to or more than a second threshold value period (hereinafter called the 'advance threshold value period') that is set shorter than the reference threshold value period of each drive 23 by a predetermined period, and thus detects a drive 23 whose elapsed period is equal to or more than this second threshold value period as a drive whose idle seek scheduled start time is approaching.

Upon detecting such a drive, the time monitoring program 17 references status information 52 in the drive management table 19 for other drives within the same parity group as the detected disk drive and then checks to see whether this status information 52 is ON (in short, whether the other drives are executing idle seek). When, as a result, there is no drive with an ON status among the other drives within the same parity group (that is, when none of the other drives is executing idle seek), the time monitoring program 17 changes the status information of the detected disk drive from OFF to ON (that is, the idle seek is considered to be ON before the idle seek is actually started) (53). As a result, data access to the detected disk drive that has been considered to be executing idle seek is avoided through the data access control by the above command issue control program 15, and therefore the autonomous start of idle seek by the detected disk drive is assured. Further, after the time monitoring program 17 has changed the status information of the detected disk drive from OFF to ON, the detected disk drive actually starts idle seek, and at the time this idle seek is estimated to have ended (when the measured elapsed period reaches a value rendered by adding a predetermined idle seek required period to the above-mentioned reference threshold value period, for example), the status information of the detected disk drive is restored once again to OFF (53).

On the other hand, when the status information of any of the other drives within the same parity group as the detected disk drive is ON (in short, when any of the other drives is executing idle seek), the time monitoring program 17 sends discrimination information for the detected disk drive, that is, the drive number 55, to the command issue control program 15. The command issue control program 15 sends a predetermined command (a dummy access command for allowing dummy access, for example) 57 to the drive specified by the dummy number 55 (the detected disk drive) to prevent the detected disk drive from autonomously starting idle seek. As a result, the concurrent execution of idle seek by two or more drives within the same parity group (hereinafter called 'multiple idle seek') does not take place.

As a result of the above control, at most only one drive 23 in a single parity group is able to execute idle seek. Further, while the status information of a certain single drive 23 is ON (during idle seek execution), read processing is completed without interrupting processing by creating data from the other drives 23, 23, . . . within the same parity group as mentioned above, whereby a delay in the processing caused by the drive 23 performing idle seek can be prevented.

Further, when there is no other drive whose status information is ON within the same parity group, the status information of a drive 23 whose idle seek scheduled start time is approaching is changed to ON, and, when a data read request for the drive 23 whose status information is ON arrives as mentioned earlier, target data from the other drives 23, 23, . . . within the same parity group is recovered and data access to this drive 23 (drive whose idle seek scheduled start time is approaching) is prevented. Therefore, this drive 23 is not hindered by data access and is able to start idle seek as per the schedule. In consequence, all the drives 23, 23, . . . are able to execute idle seek substantially equally and to a certain extent at periods that approach fixed intervals.

Next, the above control will be described with reference to a flowchart.

Figure 5:
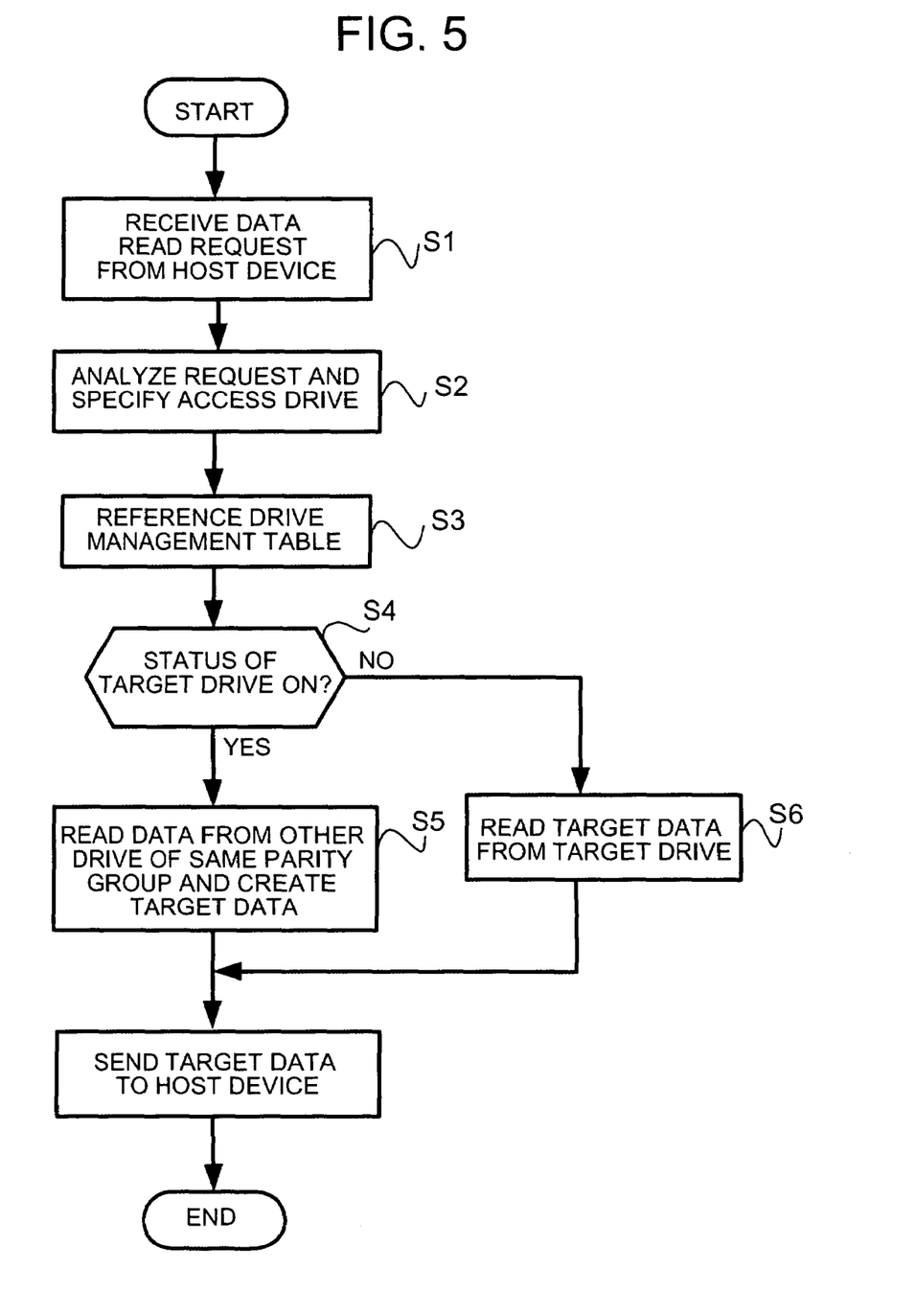
FIG. 5 is a flowchart of processing for reading data from a disk.

First, the flow of the processing when a data read request from the host device 5 is received will be described by using FIG. 5.

When, in the processing of the data read request, because, when target data is stored in the cache memory 9, target data can be obtained from the cache memory 9 and sent to the host, there is no need to perform data access with respect to the drive 23. The processing shown in FIG. 5 is processing for a case where there is no target data in the cache memory 9 and the drive 23 must therefore be accessed.

Upon receiving (S1) the data access request 31 from the host device 5, the RAID control program 13 parses the data access request 31 and specifies (S2) the drive to be accessed (hereinafter called the 'target drive'). The RAID control program 13 instructs the time monitoring program 17 to check the status information of the target drive. The time monitoring program 17 then reads (S3) the status information of the target drive in the drive management table 19 and communicates this status to the command issue control program 15. The command issue control program 15 receives the internal command (a data read request in this case) 33 shown in FIG. 3 from the RAID control program 13 and receives status information for the target drive from the time monitoring program 17, and thus checks whether the status information is ON or OFF (S4). If the status information of the target drive is ON, the command issue control program 15 reads the target data from the other drives within the same parity group and data belonging to the same data stripe and recovers the target data on the basis of these data items before returning the recovered target data to the RAID control program 13 (S5). If the status information of the target drive is OFF, the command issue control program 15 reads the target data from the target drive and returns this target data to the RAID control program 13 (S6). Once the RAID control program 13 receives the target data, same sends the target data to the host device 5 (S7).

Further, when a data write request is received from the host device 5, the write target data is temporarily written to the cache memory 9 and a response regarding write completion for the host device 5 is sent back at this time, and then the write target data can be written from the cache memory 9 to the drives 23, 23, . . . by selecting a convenient period. For this reason, there is no particular problem even when data is not written to a drive during idle seek, and hence the idle seek control as shown in FIG. 5 need not be performed.

Next, the flow of the control preventing multiple idle seek will be described by using FIG. 6.

Figure 6:
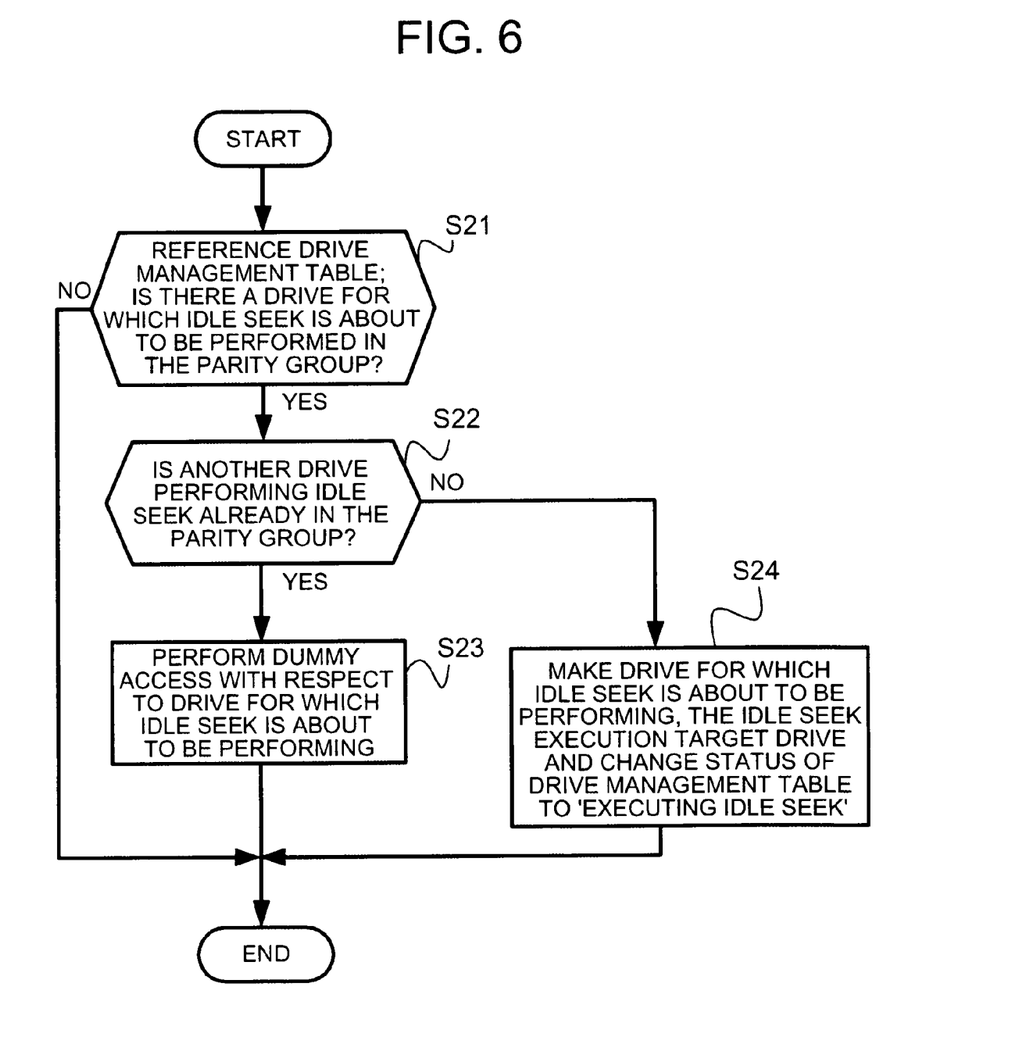
FIG. 6 is a flowchart of processing for preventing multiple idle seeks.

The time monitoring program 17 cyclically repeats the processing shown in FIG. 6 at a shorter interval than the interval at which each drive 23 repeatedly attempts idle seek start after the scheduled execution time (when the above-mentioned reference threshold value period has elapsed after the end of the previous idle seek). In short, the processing shown in FIG. 6 is repeated substantially continuously.

When starting the processing in FIG. 6, the time monitoring program 17 references the elapsed period from the time the status information of the drives 23, 23, 23, . . . is switched from ON to OFF, and checks (S21) whether or not a drive whose idle seek scheduled start time is approaching by checking whether the elapsed period is equal to or more than the advance threshold value period above. When such a drive is detected, the time monitoring program 17 checks (S22), by referencing the drive management table 19, whether there is a drive 23 whose status information is ON within the same parity group as the detected disk drive. When, as a result, a drive whose status information is ON is present within the same parity group, the command issue control program 15 performs dummy access with respect to the detected disk drive 23 (S23). By making this dummy access, multiple idle seek within the same parity group is prevented. On the other hand, when the result of step S22 is that there is not a single drive whose status information is ON within the same parity group, the status information of the detected disk drive 23 is changed from OFF to ON (S24). Although not illustrated in FIG. 6, the time monitoring program 17 returns the status information from ON to OFF when a period (or greater period) has elapsed from the moment the status information of the detected disk drive 23 is changed from OFF to ON, this period being found by adding together the differential period until the idle seek is started by the detected disk drive 23 and the period required to execute the idle seek.

The above control of the idle seek is performed in parallel with the parity group.

The control in FIG. 6 is repeated cyclically at short intervals as mentioned earlier. Therefore, when, after a predetermined interval, the control in FIG. 6 is executed again with respect to a drive the idle seek start of which has been placed on standby by the processing of step S23 (dummy access), if a certain drive whose status information is ON is not present within the same parity group, the status information is changed to ON, and, as a result, the start of idle seek is granted. Because the period required to execute for idle seek is sufficiently short compared with the advance threshold value period mentioned earlier, the period over which the start of idle seek is placed on standby is short and hence all the drives in the parity group are able to perform idle seek reliably at certain intervals.

Further, when the elapsed period of two or more drives within the same parity group exceeds the advance threshold value period, control over which drive to grant the start of idle seek to first can be implemented by means of a method that adheres to an order of priority employing drive numbers or similar.

The embodiment of the present invention was described above but merely as an example serving to explain the present invention, there being no intention to limit the scope of the present invention to this embodiment alone. Therefore, the present invention can be implemented in a variety of forms different from the embodiment above without departing from the spirit of the present invention.

For example, in the above embodiment, the progress of the schedule for the autonomous idle seek within the drives 23, 23, . . . and the idle seek status cannot be communicated by the CPU 11, which estimates such information. However, if the drives 23, 23, . . . comprise an interface that communicates, to an external device, such internal information, such as status information on whether idle seek is being executed, and the elapsed period measured from the time the previous idle seek ends, for example, the CPU 11 obtains this information from the drives 23, 23, . . . via the interface and includes this information in the drive management table 19, whereby the above-mentioned control can be performed more accurately. Further, the drives 23, 23, . . . receive commands from the CPU 11 via the interface and may comprise a function to start or not start the idle seek forcedly irrespective of the autonomously controlled time schedule therein.

What is claimed is:

1. A disk array device that provides a host device with required data in accordance with a data read request from the host device, comprising:

a plurality of disk drives that belongs to at least one parity group, each disk drive of which starts idle seek, unless data access is taking place, when a period equal to or more than a first threshold value period has elapsed from the time the previous idle seek ends;

a disk interface for communicating with the disk drives;

a host device interface for communicating with the host device; and a control device that is connected to the disk interface and the host device interface and controls the disk array device, wherein the control device comprises:

a time monitoring unit which has ON or OFF status information for each of the plurality of disk drives and alternately switches the status information of each disk drive ON and OFF, such that, in cases where a period equal to or more than a second threshold value period shorter than the first threshold value period has elapsed after switching the status information of each of the disk drives from ON to OFF, when the status information of all the other disk drives belonging to the same parity group as each of the disk drives is OFF, the status information of each of the disk drives is switched from OFF to ON, and then, once the idle seek of each of the disk drives has ended, the status information of each of the disk drives is switched from ON to OFF;

an idle seek start prediction unit that detects in advance a disk drive that is predicted to start idle seek;

a multiple idle seek prevention unit, which, in cases where a period equal to or more than the second threshold value period has elapsed after switching the status information of each of the disk drives from ON to OFF, prevents each of the disk drives from starting idle seek by performing dummy access with respect to each of the disk drives when the status information of any of the other disk drives belonging to the same parity group as the disk drives is ON; and a data access control unit which, in cases where required data is read from the disk drive in response to the read request from the host device, when the status information of a target disk drive where the required data is stored is OFF, sends the required data to the host device by reading the required data from a target disk drive and, when the status information of the target disk drive is ON, recovers the required data by reading data from all the other disk drives belonging to the same parity group as the target disk drive without performing data access with respect to the target disk drive, and then sends the required data thus recovered to the host device, wherein when the predicted disk drive that is predicted to start idle seek is detected by the idle seek start prediction unit, if another drive within the same parity group as the predicted disk drive is executing idle seek, the multiple idle seek prevention unit performs dummy access with respect to the predicted disk drive so that the predicted disk drive does not start idle seek.

2. The disk array device according to claim 1, wherein: the time monitoring unit comprises:

a drive management table that stores, for each of the plurality of disk drives, the status information and the elapsed period from the time the status information was switched from ON to OFF on the previous occasion, the status information and elapsed period being associated with discrimination information for each of the disk drives and discrimination information for a parity group to which the disk drives belong; and the data access control unit judges whether to switch the status information of each of the disk drives from OFF to ON by referencing the drive management table.

3. A disk array device that comprises a plurality of disk drives belonging to at least one parity group, each disk drive of which starts idle seek unless data access is taking place, in accordance with a predetermined time schedule, comprising:

an idle seek start prediction unit that detects in advance a first disk drive that is predicted to start idle seek;

a multiple idle seek prevention unit that controls the plurality of disk drives so that, within the same parity group, at most only one disk drive executes idle seek and two or more disk drives do not execute idle seek at the same time; and data read control means that, when a data read request with respect to a disk drive executing idle seek is received, recover required data by reading data from all the other disk drives belonging to the same parity group as the disk drive executing idle seek, wherein when the disk drive that is predicted to start idle seek is detected by the idle seek start prediction unit, in cases where another drive within the same parity group as the detected disk drive is executing idle seek, the multiple idle seek prevention unit performs dummy access with respect to the detected disk drive so that the detected disk drive does not start idle seek.

4. The disk array device according to claim 3, further comprising:

an idle seek start prediction unit that detects in advance a disk drive that is predicted to start idle seek in accordance with the predetermined time schedule, wherein:

when the disk drive that is predicted to start idle seek is detected by the idle seek start prediction unit, the data read control means consider that the detected disk drive is executing idle seek in cases where no other disk drive within the same parity group as the detected disk drive is executing idle seek, and, when a data read request with respect to the detected disk drive is then received, the data read control means recover the required data from data in all the other disk drives belonging to the same parity group as the detected disk drive up until the detected disk drive ends idle seek.

5. A method for controlling the idle seek of a plurality of disk drives of a disk array device that provides a host device with required data in accordance with a data read request from the host device, comprising: a plurality of disk drives that belongs to at least one parity group, each disk drive of which starts idle seek, unless data access is taking place, when a period equal to or more than a first threshold value period has elapsed from the time the previous idle seek ends; an idle seek start prediction unit that detects in advance said each disk drive of which starts idle seek; a disk interface for communicating with the disk drives; a host device interface for communicating with the host device; and a control device that is connected to the disk interface and the host device interface and controls the disk array device, said method comprising the steps of:

storing ON or OFF status information for each of the plurality of disk drives;

switching the status information of each disk drive ON and OFF, such that, in cases where a period equal to or more than a second threshold value period shorter than the first threshold value period has elapsed after switching the status information of each of the disk drives from ON to OFF, when the status information of all the other disk drives belonging to the same parity group as each of the disk drives is OFF, the status information of each of the disk drives is switched from OFF to ON;

detecting in advance said each disk drive of which starts idle seek;

when said each disk drive of which starts idle seek is detected, if another drive within the same parity group as the detected disk drive is executing idle seek, performing dummy access with respect to the detected disk drive so that the detected disk drive does not start idle seek;

once the idle seek of each of the disk drives has ended after the status information of each of the disk drives is switched from OFF to ON, switching the status information of each of the disk drives from ON to OFF;

in cases where a period equal to or more than the second threshold value period has elapsed after switching the status information of each of the disk drives from ON to OFF, preventing each of the disk drives from starting idle seek by performing dummy access with respect to each of the disk drives when the status information of any of the other disk drives belonging to the same parity group as the disk drives is ON;

in cases where required data is read from the disk drive in response to the read request from the host device, when the status information of a target disk drive where the required data is stored is OFF, sending the required data to the host device by reading the required data from the target disk drive and, in cases where required data is read from the disk drive in response to the read request from the host device, when the status information of the target disk drive is ON, recovering the required data by reading data from all the other disk drives belonging to the same parity group as the target disk drive without performing data access with respect to the target disk drive, and then sending the required data thus recovered to the host device.

6. A method of controlling the idle seek of a plurality of disk drives belonging to at least one panty group of a disk array device that comprises the plurality of disk drives, each disk drive of which starts idle seek unless data access is taking place, in accordance with a predetermined time schedule, comprising the steps of:

controlling the plurality of disk drives so that, within the same parity group, at most only one disk drive, that is not undergoing data access, executes idle seek such that two or more disk drives do not execute idle seek at the same time;

detecting in advance said each disk drive of which starts idle seek;

performing dummy access to another disk drive within the same parity group which is predicted about to start idle seek so that the predicted disk drive does not start idle seek; and when a data read request with respect to a disk drive executing idle seek is received, recovering required data by reading data from all the other disk drives belonging to the same parity group as the disk drive executing idle seek.

* * * * *